US008954550B2

(12) United States Patent
Zhang et al.

(10) Patent No.: US 8,954,550 B2
(45) Date of Patent: Feb. 10, 2015

(54) SERVICE DEPENDENCY DISCOVERY IN ENTERPRISE NETWORKS

(75) Inventors: Ming Zhang, Redmond, WA (US); Xu Chen, Ann Arbor, MI (US); Paramvir Bahl, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1771 days.

(21) Appl. No.: 12/030,284

(22) Filed: Feb. 13, 2008

(65) Prior Publication Data

US 2009/0204696 A1  Aug. 13, 2009

(51) Int. Cl.
*G06F 15/173* (2006.01)
*H04L 29/06* (2006.01)
*H04L 29/08* (2006.01)

(52) U.S. Cl.
CPC .............. *H04L 67/325* (2013.01); *H04L 69/16* (2013.01); *H04L 69/163* (2013.01); *H04L 67/16* (2013.01)
USPC ....................................................... 709/223

(58) Field of Classification Search
USPC ....................................................... 709/223
See application file for complete search history.

(56) References Cited

U.S. PATENT DOCUMENTS

| | | | |
|---|---|---|---|
| 6,115,393 A * | 9/2000 | Engel et al. ................... | 370/469 |
| 6,128,773 A * | 10/2000 | Snider ........................... | 717/132 |
| 6,269,473 B1 * | 7/2001 | Freed et al. ................... | 717/104 |
| 6,286,047 B1 | 9/2001 | Ramanathan et al. | |
| 6,847,970 B2 * | 1/2005 | Keller et al. ........................... | 1/1 |
| 7,042,879 B2 * | 5/2006 | Eschbach et al. ............. | 370/392 |
| 7,043,494 B1 * | 5/2006 | Joshi et al. ............................. | 1/1 |
| 7,092,707 B2 | 8/2006 | Lau et al. | |
| 7,243,306 B1 | 7/2007 | Joshi et al. | |
| 7,334,222 B2 * | 2/2008 | Keller ........................... | 717/135 |
| 7,409,676 B2 * | 8/2008 | Agarwal et al. ............... | 717/120 |
| 7,821,947 B2 * | 10/2010 | MacCormick et al. ........ | 370/241 |
| 8,140,523 B2 * | 3/2012 | Fakhouri et al. .............. | 707/720 |
| 8,443,074 B2 * | 5/2013 | Bahl et al. ..................... | 709/224 |
| 2002/0116154 A1 * | 8/2002 | Nowak et al. ................. | 702/186 |
| 2002/0129157 A1 | 9/2002 | Varsano | |
| 2002/0129356 A1 * | 9/2002 | Hellerstein et al. ........... | 717/177 |
| 2004/0041840 A1 | 3/2004 | Green et al. | |
| 2004/0046785 A1 * | 3/2004 | Keller ........................... | 345/734 |
| 2004/0049372 A1 * | 3/2004 | Keller ............................. | 703/22 |
| 2004/0049596 A1 * | 3/2004 | Schuehler et al. ............ | 709/238 |

(Continued)

OTHER PUBLICATIONS

Tivoli Application Dependency Discovery Manager http://www-142.ibm.com/software/dre/ecatalog/detail.wss?locale=en_GB&synkey=O927756V31688Y75. Last accessed Jan. 9, 2008, 2 pages.

(Continued)

*Primary Examiner* — Backhean Tiv
(74) *Attorney, Agent, or Firm* — Steve Wight; Judy Yee; Micky Minhas

(57) ABSTRACT

The claimed subject matter provides systems and/or techniques that identify service dependencies in enterprise networks. The system can include devices that, based on received network data packets, identify packets with common five tuples, aggregate the identified packets to form transactions associated with individual hosts, and determine delay distributions between one or more services solicited from or in response to the individual hosts. Based on the delay distributions, the system differentiates between dependent service pairs and independent service pairs and thereafter assembles and outputs dependency graphs that include dependency relationships between services from the perspective of a client-side and a server-side.

20 Claims, 12 Drawing Sheets

(56) References Cited

U.S. PATENT DOCUMENTS

| | | | |
|---|---|---|---|
| 2004/0177244 | A1 | 9/2004 | Murphy et al. |
| 2004/0261079 | A1 | 12/2004 | Sen |
| 2005/0181835 | A1* | 8/2005 | Lau et al. .................... 455/567 |
| 2006/0259627 | A1* | 11/2006 | Kellerer et al. .............. 709/227 |
| 2006/0268932 | A1* | 11/2006 | Singh et al. .................. 370/468 |
| 2007/0002751 | A1 | 1/2007 | Wullert et al. |
| 2007/0038983 | A1 | 2/2007 | Stienhans |
| 2007/0094211 | A1* | 4/2007 | Sun et al. ....................... 706/50 |
| 2007/0294406 | A1 | 12/2007 | Suer et al. |
| 2007/0294668 | A1 | 12/2007 | Mohindra et al. |
| 2008/0222068 | A1* | 9/2008 | Bahl et al. ..................... 706/46 |
| 2008/0267083 | A1* | 10/2008 | MacCormick et al. ....... 370/252 |
| 2009/0043809 | A1* | 2/2009 | Fakhouri et al. .............. 707/102 |
| 2009/0132692 | A1* | 5/2009 | Ansari et al. .................. 709/223 |
| 2009/0204696 | A1* | 8/2009 | Zhang et al. .................. 709/223 |

OTHER PUBLICATIONS

Paramvir Bahl, et al. Discovering Dependencies for Network Management. Last accessed Feb. 13, 2008, 6 pages.
Victor Bahl, et al. Towards Highly Reliable Enterprise Network Services Via Inference of Multi-level Dependencies. SIGCOMM'07, Aug. 27-31, 2007, Kyoto, Japan. ACM 978-1-59593-713-1/07/0008. Last accessed Feb. 13, 2008, 12 pages.
A. Brown, et al. An Active Approach to Characterizing Dynamic Dependencies for Problem Determination in a Distributed Environment. http://roc.cs.berkeley.edu/papers/im01.pdf. Last accessed Jan. 9, 2008, 14 pages.
William Aiello, et al. Analysis of Communities of Interest in Data Networks. http://www.research.att.com/~kobus/docs/coi.pdf. Last accessed Jan. 9, 2008, 14 pages.
Marcos K. Aguilera, et al. Performance Debugging for Distributed Systems of Black Boxes. SOSP'03, Oct. 19-22, 2003, Bolton Landing, New York, USA. ACM 1-58113-757-5/03/0010. http://pdos.csail.mit.edu/~athicha/papers/blackboxes:sosp03.pdf. Last accessed Jan. 9, 2008, 16 pages.
Business Technology Optimization (BTO) Software https://h10078.www1.hp.com/cda/hpms/display/main/hpms_home.jsp?z . . . Last accessed Jan. 9, 2008, 1 page.
Richard Black, et al. Ethernet topology discovery without network assistance. Proceedings of the 12th IEEE International Conference on Network Protocols (ICNP'04) 1092-1648/04. http://www.ieee-icnp.org/2004/papers/9-1.pdf. Last accessed Jan. 9, 2008, 12 pages.
Ruoming Pang, et al. A First Look at Modern Enterprise Traffic. Internet Measurement Conference, 2005. http://www.icir.org/enterprise-tracing/first-look-imc05.pdf. Last accessed Jan. 9, 2008, 14 pages.
John Dunagan, et al. FUSE: Lightweight Guaranteed Distributed Failure Notification http://research.microsoft.com/sn/Herald/papers/FUSE_submission.pdf. Last accessed Jan. 9, 2008, 14 pages.
Shaula Alexander Yemini, et al. High Speed and Robust Event Correlation. IEEE Communications Magazine, May 1996. 0163-6804/96 http://ieeexplore.ieee.org/iel1/35/10618/00492975.pdf?tp=&isnumber=&arnumber=492975. Last accessed Jan. 9, 2008, 9 pages.
IBM Tivoli Software. http://www.ibm.com/software/tivoli/. Last accessed Jan. 9, 2008, 2 pages.
Joel Sommers, et al. Improving Accuracy in End-to-end Packet Loss Measurement. SIGCOMM'05, Aug. 21-26, 2005, Philadelphia, Pennsylvania, USA. ACM 1-59593-009-4/05/0008. http://www.sigcomm.org/sigcomm2005/paper-SomBar.pdf. Last accessed Jan. 9, 2008, 12 pages.
Ramana Rao Kompella, et al. IP Fault Localization Via Risk Modeling. http://kailash.ucsd.edu/~ramana/papers/nsdi05.pdf. Last accessed Jan. 9, 2008, 15 pages.
Multi Router Traffic Grapher. http://www.mrtg.com/. Last accessed Jan. 9, 2008, 2 pages.
Mike Y. Chen, et al. Path-based failure and evolution management. http://research.microsoft.com/~emrek/pubs/paths-nsdi.pdf. Last accessed Jan. 9, 2008, 14 pages.
Srikanth Kandula, et al. Shrink: A Tool for Failure Diagnosis in IP Networks. SIGCOMM'05 Workshops, Aug. 22-26, 2005, Philadelphia, PA, USA. ACM 1-59593-026-4/05/0008 http://nms.lcs.mit.edu/~kandula/shrink.ps. Last accessed Jan. 9, 2008, 6 pages.
Microsoft Operations Manager 2007. http://www.microsoft.com/systemcenter/opsmgr/default.mspx. Last accessed Jan. 9, 2008, 3 pages.
Yuri Breitbart, et al. Topology discovery in heterogeneous IP networks: the NetInventory system. IEEE/ACM Transactions on Networking, vol. 12, No. 3, Jun. 2004. Digital Object Identifier 10.1109/TNET.2004.828963 http://delivery.acm.org/10.1145/1010000/1008464/p401-breitbart.pdf?key1=1008464&key2=5391989911&coll=Guide&dl=Guide&CFID=11581269&CFTOKEN=53161659. Last accessed Jan. 9, 2008, 14 pages.
Ratul Mahajan, et al. User-level Internet Path Diagnosis. SOSP'03, Oct. 19-22, 2003, Bolton Landing, New York, USA. ACM 1-58113-757-5/03/0010. http://www.cs.rochester.edu/meetings/sosp2003/papers/p228-mahajan.pdf. Last accessed Jan. 9, 2008, 14 pages.
Paul Barham, et al. Using Magpie for Request Extraction and Workload Modelling. USENIX Association OSDI '04: 6th Symposium on Operating Systems Design and Implementation http://www.usenix.org/events/osdi04/tech/full_papers/barham/barham.pdf. Last accessed Jan. 9, 2008, 14 pages.
Patrick Reynolds, et al. WAP5: Black-box Performance Debugging for Wide-area Systems. WWW 2006, May 23-26, 2006, Edinburgh, Scotland. ACM 1-59593-323-9/06/0005. http://www2006.org/programme/files/pdf/2033.pdf. Last accessed Jan. 9, 2008, 10 pages.
David Oppenheimer, et al. Why do Internet services fail, and what can be done about it? 4th Usenix Symposium on Internet Technologies and Systems (USITS '03), 2003. http://roc.cs.berkeley.edu/papers/usits03.pdf. Last accessed Jan. 9, 2008, 15 pages.
Kevin P. Murphy, et al. Loopy Belief Propagation for Approximate Inference: An Empirical Study. UAI'99. Last accessed Jan. 9, 2008, 9 pages.
WinPcap: The Windows Packet Capture Library. Last modified: Tuesday, Nov. 13, 2007. http://www.winpcap.org/. Last accessed Jan. 9, 2008, 1 page.
Duda, et al. "Pattern Classification" (2007) Glorious Printers, New Delhi.
Pearl. "Probabilistic Reasoning in Intelligent Systems: Networks of Plausible Inference" (1988) Morgan Kaufmann Publishers, Inc., San Francisco.

* cited by examiner

SERVICE DEPENDENCY DISCOVERY IN ENTERPRISE NETWORKS

BACKGROUND

An enterprise network is both local and wide area in scope. Typically, it integrates all the systems within an organization, whether they are Personal Computers, UNIX workstations, minicomputers, or mainframes. In fact in an enterprise network all systems can potentially communicate with all other systems in the network while maintaining reasonable performance, security, and reliability.

Such interoperability has been achieved mainly with Internet protocols and Web technologies that generally provide better results at lower costs and fewer configuration problems than enterprise computing models would predict. The Transport Control Protocol (TCP) and Internet Protocol (IP), more commonly referred to as TCP/IP, have been the unifying internetworking protocols that have allowed enterprises and organizations to interconnect workgroup and divisional Local Area Networks (LANs), and provide connection with the Internet. Web protocols, such as Hypertext Mark Language (HTML), Hypertext Transfer Protocol (HTTP), and Extensible Markup Language (XML), for example, have similarly unified user interfaces, applications, and data formatting, providing organizations a common framework upon which to construct intranets (e.g., internal internets). A Web browser is akin to a universal client, and Web servers can provide data to any of those clients. Web servers are typically distributed throughout the enterprise, following distributed computing models. Multi-tiered architectures can generally be employed, wherein Web clients access Web servers, and Web servers access back-end data sources, such as mainframes and/or server farms that can include databases, and authentication services, for example, all of which can be essential to the smooth functioning of the enterprise network in its totality. Failure of one server and/or service can have a catastrophic chain reaction knock on effect causing other dependent servers and/or services to become similarly inoperable. For instance, the failure of an authentication server/service can be the causal nexus for the failure of a multitude of related web services. Such concomitant relationships between server and/or services can typically be referred to as a service dependency, expeditious identification of which can be crucial to the smooth and continuous operation of enterprise networks.

SUMMARY

The following presents a simplified summary in order to provide a basic understanding of some aspects of the disclosed subject matter. This summary is not an extensive overview, and it is not intended to identify key/critical elements or to delineate the scope thereof Its sole purpose is to present some concepts in a simplified form as a prelude to the more detailed description that is presented later.

The claimed subject matter provides a scalable and accurate way of detecting service-level dependency relationships in an enterprise network that does not require application modification or software installation on associated machines. More particularly, the subject matter as claimed provides systems that identify service dependencies in enterprise networks. The systems disclosed can include devices and components that, based on received network data packets, identify packets with common five tuples, aggregate the identified packets to form transactions associated with individual hosts, and determine delay distributions between one or more services solicited from or in response to the individual hosts. Based on the delay distributions, the system differentiates between dependent service pairs and independent service pairs and thereafter assembles and outputs dependency graphs that include dependency relationships between services from a client-side or a server-side perspective.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
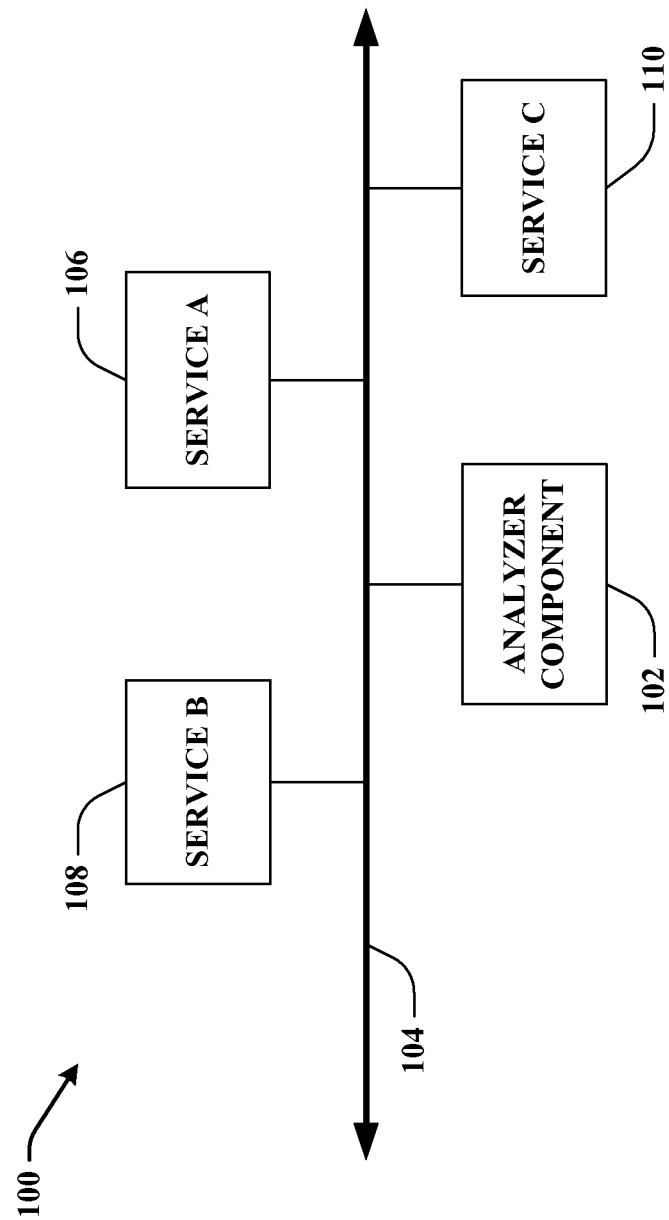
FIG. 1 illustrates a machine-implemented system that automatically produces, develops, or actualizes dependency graphs that identify service dependencies in enterprise networks in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Discovering service-level dependency is of great importance in enterprise network management. Obtaining accurate dependency information can not only ease the troubleshooting procedure, but can also help long-term resource planning. For example, a system that aims to provide Information Technology (IT) administrators tools needed to localize the faults that can affect user perceived performance problems, can be of utmost utility, especially where the system is constructed based on the notion of a service-level dependency graph, in which each node is a particular service that includes an information triplet, for example, IP address, port, and protocol, and each edge provides a dependency relationship. In such a dependency graph one can say that service A depends on service B, provided that service B is crucial for service A to complete to fruition. One simple example is that of the prototypical web service that depends on a DNS service, for should the DNS service fail, users would not be able to know the actual IP address of the web service, thus any potential web transaction that might have taken place during the failure of the DNS service will be irretrievably lost. Another common example is a web service that depends on the back-end SQL service. Upon receiving the user's request, the web service typically makes contact with back-end SQL services in order to fetch appropriate information to forward to the user. If the SQL services are not available, putative web transactions also fail. It should be noted that the two foregoing dependency relationships are totally different, the first happens in the client side, while a second happens in the server side.

To date, inference of dependency information has been based on co-occurrence; on the intuition that two dependent services are likely to co-occur time-wise. However, inferring dependency information based on co-occurrence is typically not suitable for accurate dependency discovery. Accordingly, to overcome this shortcoming the claimed subject matter can infer dependency relationships based at least in part on the delay distribution between two services.

Generally, one can define service dependencies as follows. Service A can depend on service B if service B is crucial for service A's success. Nevertheless, the notion of dependency can have subtle differences on the client-side and the server-side. On the client side, all the services reside on remote machines. A client usually contacts different services to fulfill one transaction of an application. For example, accessing a particular website can require the client to contact a DNS server first to resolve the domain name, authenticate with an authentication service (e.g., Kerberos) to acquire necessary security tokens, and then contact the web server to fetch the webpage. If either of the DNS service or the authentication service fails, a client may not be able to access the web service. Accordingly, one can state that the web service depends on the DNS service and the authentication service. On the service side, upon receiving a web request from a client, the server may contact a back-end SQL service to retrieve necessary information to fulfill the user's request. Here, one can also state that the web service depends on the SQL service, though this is quite different from client-side dependency.

Previous methods of discovering service dependency information were based on the assumption that if service A depends on service B, they are likely to co-occur within a small time window, namely a dependency window. Discovering the services that a particular service A depends on becomes finding the most frequently appearing services that co-occur with service A. There are, however, three major problems with this approach. First, it is difficult to choose an appropriate size for a dependency window—too large a window can introduce more false positives, while too small a window can result in more false negatives. It has been found that many dependent services can typically be separated by up to 100 milliseconds, while on a busy server everything can happen within a very short time gap. Second, the results of accessing some services can be stored for future use. For example, the results for DNS queries are usually cached on client machines, thus the frequency of needing to access DNS services before contacting a web service can be much less than 1. Simply counting co-occurrence frequency can miss services such as secondary DNS servers/services since such servers/services can be infrequently utilized. Third, counting frequency is typically likely to fail when analyzing dependent services of popular services that are accessed regularly at high frequencies. For example, the packet trace of a major web server has revealed that the web service transactions almost co-occur with all other services, since the web server is being utilized across the entirety of the enterprise network.

Instead of counting the frequency of co-occurrence, the claimed subject matter can analyze the delay distribution between services. The basic premise is that dependent services should have a typical time delay between them. For example, upon receiving a DNS reply, a client host needs to un-encapsulate and parse the packet in the packet payload, cause a context switch to finish the system call of gethostbyname ( ), and call another function connect ( ) to establish a TCP connection to the server machine, which is a new transaction that the claimed subject matter can observe. From the perspective of the claimed subject matter, in between calling the gethostbyname ( ) and connect ( ) functions, there can be a fixed sequence of operations which typically have a fixed or pre-determinable processing times. Accordingly, if a PDF (Probability Density Function) graph were plotted of the delay between services, there should be one or more significant spikes, revealing typical delays where there is an interconnection between the services. If on the other hand, services are completely independent of one another, any delay between the services should be uniformly distributed—the PDF graph should typically be fairly flat without any spikes.

Ideally, the subject matter as claimed should inspect network packets related to every machine. One way of accomplishing this can be to deploy traffic analyzers on every host in the enterprise network, including all clients and servers. However, as will be appreciated and recognized, such an exhaustive approach can be financially prohibitive and/or impractical because of the operational costs and running overhead. An alternative approach can be to sniff packets at certain places in the network where most of the packets go through. For example, a packet analyzer can be situated on routers situated between all clients and servers and servers and other routers between all the front-end servers and back-end servers where the packet analyzer machines can be connected to the SPAN ports of the routers and can be executing a modified version of a computer network debugging tool that allows interception and display of network packets being transmitted and/or received over the network to which the packet analyzer is attached (e.g., tcpdump, windump, etc.).

Under the foregoing alternative and more cost effective approach, the packets exchanged between clients and servers typically are all seen on a first packet analyzer—this is equivalent to installing packet analyzers at each client machine with a realization that the timestamps generate can generally be offset by less than 1 ms. Moreover, such a financially prudent implementation does not generally require installation of extra and superfluous software on client machines.

On the server side, servers that the claimed subject matter aims to interrogate or monitor are typically configured with two network cards—one for incoming packets from clients and another for outgoing packets to clients and all packets exchanged with back-end servers for the sake of load balancing. In general, the two network cards are typically connected to different routers. Accordingly, packet analyzers can be connected to both of the routers and ideally should merge the two traces to form a complete view of the packets going into and out of the front-end servers. Nevertheless, it can be extremely difficult to synchronize the two packet analyzers accurately even when Network Time Protocol (NTP) is utilized. The time difference between two packet traces can jump across time, probably because of the scheduling problem of multiple processors. Fortunately, half of the front-end transactions (all packets that the servers send back to clients, synchronize packets (SYN) and/or acknowledgement packets (ACK), for example) and the full back-end transactions can be sniffed by the same machine, which can be sufficient for the claimed subject matter to find the dependency between front-end and back-end transactions.

FIG. 1 depicts an illustrative system 100 that in accordance with an aspect of the claimed subject matter automatically produces, develops, or actualizes dependency graphs that can identify service dependencies in enterprise networks. System 100 can include an analyzer component 102 that can be situated on, and can be in continuous and/or operative, or sporadic and/or intermittent, communication with a network topology or cloud 104. Analyzer component 102 can be a packet sniffer, network analyzer, protocol analyzer, Ethernet sniffer, or wireless sniffer implemented in software, machine hardware, or a combination of software in execution and/or machine hardware that can intercept and log network traffic passing over network topology or cloud 104 or portions or segments thereof. As data flows across network topology or cloud 104, analyzer component 102 can capture each packet and decode and analyze its content according to appropriate specifications promulgated by various internetworking and computer network engineering organizations (e.g., the Institute of Electrical and Electronics Engineers (IEEE), Association for Computing Machinery (ACM), the Internet Society (ISOC), etc.). As illustrated analyzer component 102 can be in operative communication with service A 106, service B 108 and/or service C 110, via network topology 104, wherein analyzer 102 can intercept or monitor packet traffic emanating from, traversing through, or communicated to service A 106, service B 108, or service C 110.

Network topology or cloud 104 can include any viable communication and/or broadcast technology, for example, wired and/or wireless modalities and/or technologies can be utilized to effectuate the claimed subject matter. Moreover, network topology or cloud 104 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and distributed—and/or any combination, permutation, and/or aggregation thereof. Additionally, network topology or cloud 104 can include or encompass communications or interchange utilizing Near-Field Communications (NFC).

Service A 106, service B 108, and/or service C 110 can be implemented entirely in hardware and/or as a combination of hardware and/or software in execution. Further, service A 106, service B 108, and/or service C 110 can be any type of machine that includes a processor and is capable of effective communications with network topology or cloud 104. Illustrative machines that can comprise service A 106, service B 108, and/or service C 110 can include desktop computers, server class computing devices, cell phones, smart phones, laptop computers, notebook computers, Tablet PCs, consumer and/or industrial devices and/or appliances, hand-held devices, personal digital assistants, multimedia Internet enabled mobile phones, multimedia players, and the like. More particularly, service A 106 as depicted can be a web client, such as a web browser, that enables users to display and interact with text, images, videos, music and other information typically located on a webpage at a website on the World Wide Web or a local area network. Further, as illustrated service B 108, for the purposes of illustration rather than limitation, can be a web server—an application or machinery responsible for accepting Hypertext Transport Protocol (HTTP) requests from clients (e.g., service A 106), and serving them HTTP responses along with optional data content which typically are web pages such as HTML documents and linked objects (e.g., images, videos, etc.). Moreover, service C 110, once again for the purposes of illustration rather than limitation, can be one or more ancillary services required to effectuate a transaction or interchange between service A 106 (e.g., web client) and service B 108 (e.g. web server). Illustrative ancillary and/or supportive services required to effectuate and facilitate transactions and/or dynamic data interchange between service A 106 and service B 108 to fruitful conclusion can include, but is not limited to, Domain Name System (DNS) services, Windows Internet Name Services (WINS), Proxy Services, Local Link Multicast Name Resolution (LLMNR) services, SQL-services, and the like.

Figure 2:
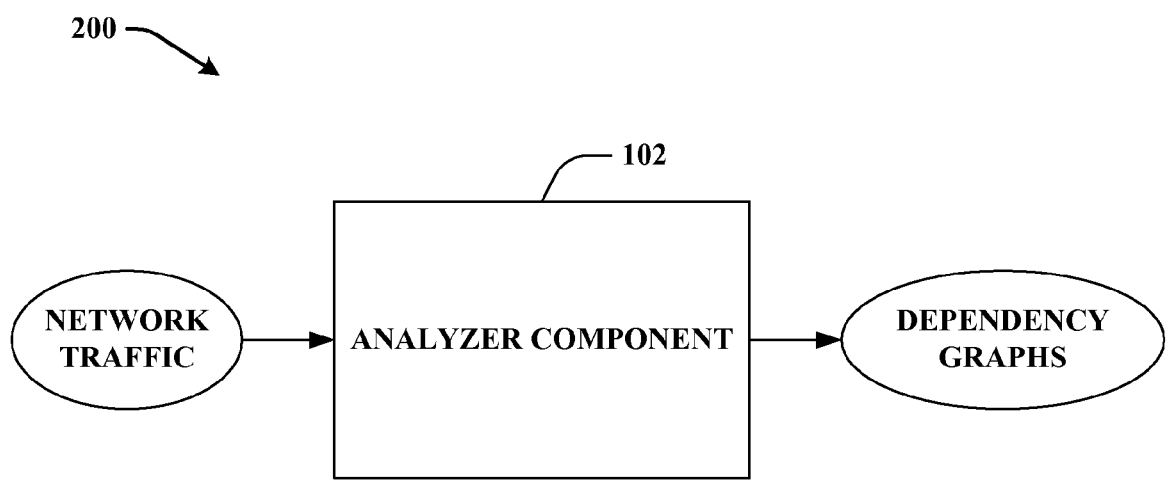
FIG. 2 depicts machine-implemented system that effectuates and/or facilitates automatically generating, propagating, or establishing dependency graphs that identify service dependencies in enterprise networks in accordance with an aspect of the claimed subject matter.

FIG. 2 provides illustration of a machine implemented system 200 that effectuates and/or facilitates automatically generating, propagating, or establishing dependency graphs that identify service dependencies in enterprise networks in accordance with an aspect of the claimed subject matter. As illustrated system 200 includes analyzer component 102 that can receive network traffic (e.g., in the form of packet traffic) from a multitude of sources such as, for example, service A 106, service B 108, and/or service C 110. Typically, analyzer component 102 can inspect network packets related to every machine or component affiliated with it (e.g., service A 106, service B 108, and service C 110). Analyzer component 102 can be situated on routers located between all clients and/or servers (e.g., service A 106 and service B 108), between servers and other routers, and/or between all the front-end servers and back-end servers. Typically, analyzer component 102 can be positioned and/or connected to SPAN ports associated with the routers and can, without limitation, be running modified versions of computer debugging software that allow interception, inspection, and display of network packets that are being transmitted and/or received over the network to which analyzer component 102 is attached.

On receipt or interception of packets from the network analyzer component 102 can perform transaction extraction wherein single packets that are intercepted or received can be aggregated into transactions for each host. Additionally, analyzer component 102 can undertake delay distribution determination where after extracting lists of transactions for each host delay distributions between various services can be ascertained from the perspective of a single host. Once analyzer component 102 has produced delay distribution between various services from the perspective of each host, analyzer component 102 can commence dependency inference wherein dependent service pairs can be differentiated from independent service pairs, after which analyzer component 102 can utilize the dependency relationships on both the client-side and server side and combine them together to form generic dependency graphs that can be output and further utilized.

Figure 3:
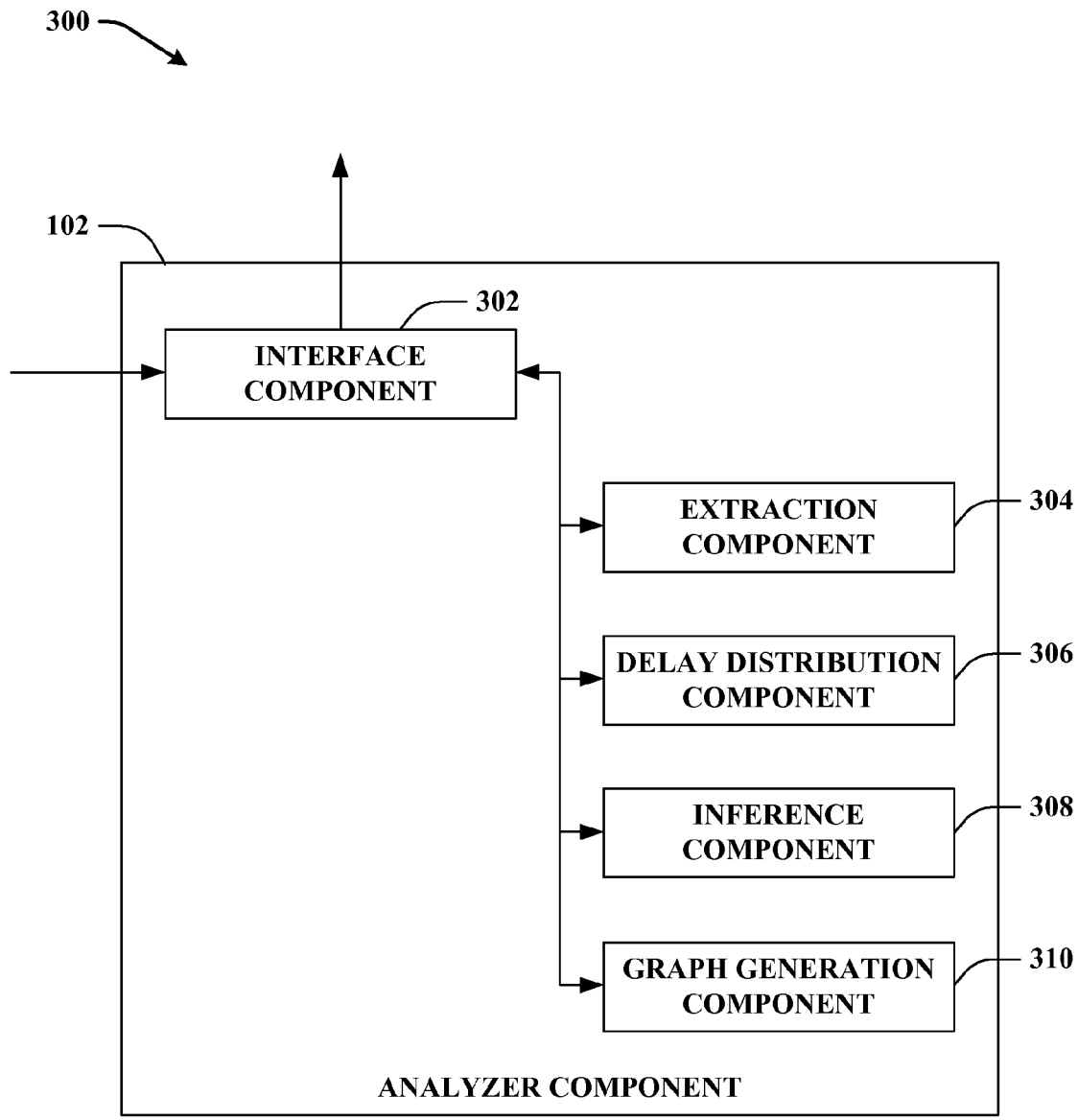
FIG. 3 provides a more detailed depiction of an illustrative analyzer component that effectuates and/or facilitates extemporaneous formulation, organization, or compilation of dependency graphs that identify service dependencies in enterprise networks in accordance with an aspect of the claimed subject matter.

FIG. 3 provides a more detailed depiction 300 of illustrative analysis component 102 that effectuates and/or facilitates extemporaneous formulation, organization, or compilation of dependency graphs that identify service dependencies in enterprise networks in accordance with an aspect of the claimed subject matter. As illustrated analysis component 102 can include interface component 302 (hereinafter referred to as "interface 302") that can receive and/or propagate, communicate, and/or partake in data interchange with a plurality if disparate sources and/or components. For instance, interface 302 can receive and/or acquire network traffic in the form of packet traffic from many sources such as, for instance, service A 106, service B 108, and/or service C 110. Once interface 302 has received or acquired network traffic, it can disseminate the received packets to extraction component 304, delay distribution component 306, inference component 308, and graph generation component 310 for further utilization, processing, and/or analysis. To facilitate it aims, interface 302 can provide various adapters, connectors, channels, communication pathways, etc. to integrate the various components included in system 300 into virtually any operating system and/or database system and/or with one another. Additionally and/or alternatively, interface 302 can provide various adapters, connectors, channels, communication modalities, and the like, that can provide for interaction with various components that can comprise system 300, and/ or any other component (external and/or internal), data, and the like, associated with system 300.

Analyzer component 102 can also include extraction component 304 that can aggregate single packets received into transactions. While it is natural to think that dependencies should exist at the event-level rather than at the packet-level, since a single transaction between hosts (e.g., services and/or servers) can have multiple packets, it is generally not a good idea to identify packet-level dependency as the number of packets that can be received and require analysis can be so large that efficient processing can become insurmountable.

Extraction component 304 can monitor network packet traffic to identify TCP packets and/or User Datagram Protocol (UDP) packets that are continuously traversing the cloud or network topology. For TCP packets, extraction component 304 can utilize SYN flag or a SYN-ACK flag without a preceding SYN flag to indicate the start of a new transaction, for instance, and a FIN (e.g., no more data from the sender) flag or RST (e.g., reset the connection) flag to indicate the end of the current transaction in the flow. For UDP packets extraction component 304 can put a sequence of contiguous packets within the same flow whose intervals are within a particular timeout value and can classified this sequence of contiguous packets to be a transaction, for example. This is because UDP flows do not typically have a syntax that can be easily parsed.

Moreover, analyzer component 102 can include delay distribution component 306 that can be utilized after a list of transactions from each host has been extracted. With the list of transactions from each host delay distribution component 306 can determine a delay distribution between services from each host's perspective. Delay distribution component 306 can accomplish the foregoing in the following manner. First, delay distribution component 306 can for each transaction can identify a service that is being, or attempted to be, employed from both the client-side perspective and the server-side, once the service has been ascertained, delay distribution component 306 can determine the delay distribution for all service pairs (e.g., remote-remote, local-remote, remote-local), and thereafter delay distribution component 306 can aggregate the ascertained delay distribution of all service pairs observed by individual hosts across multiple hosts based on the premise that an individual host may not see enough samples for a particular delay distribution.

Additionally, analyzer component 102 can further include inference component 308. Once delay distributions have been generated there can be a need to differentiate dependent service pairs from independent service pairs based on the supposition that dependent services are more likely to be separated by a typical time delay, characterizing the usual processing time of the applications. Accordingly, in terms of delay distribution graphs, there can be significant spikes which inference component 308 can attempt to detect.

Furthermore, analyzer component 102 can include graph generation component 310 that utilizes the dependency relationships ascertained and/or determined by the foregoing components that are included in analyzer component 102 to coalesce a generic dependency graph that can be output and further utilized for network administration and analysis, capacity planning, or impact planning, for example.

Figure 4:
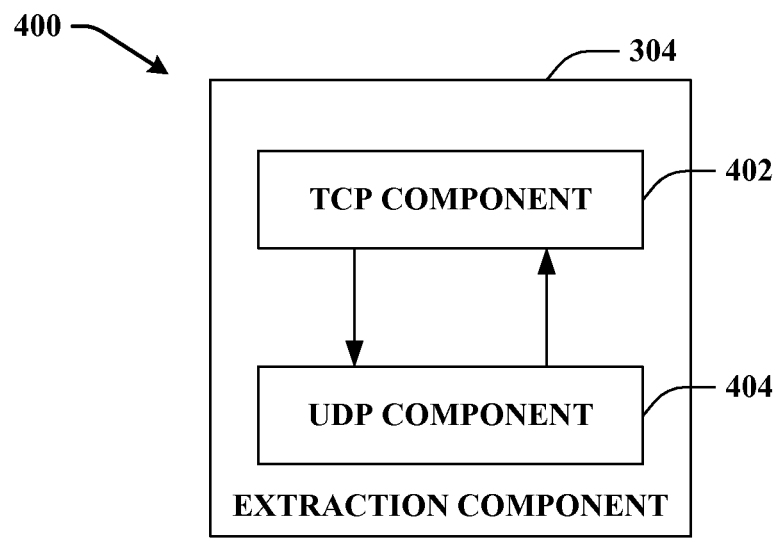
FIG. 4 provides a more detailed depiction of an extraction component that facilitates or effectuates dynamic determination or construction of dependency graphs that identify service dependencies in enterprise networks in accordance with an aspect of the claimed subject mater.

FIG. 4 provides a more detailed depiction 400 of an extraction component 304 that facilitates or effectuates dynamic determination or construction of dependency graphs that identify service dependencies in enterprise networks in accordance with an aspect of the claimed subject matter. Extraction component 304 can monitor packet traffic traversing through a network to identify TCP packets and/or UDP packets. As illustrated extraction component 304 can include TCP component 402 and UDP component 404.

A flow of packets can be defined as a sequence of packets that have the same five-tuple (e.g., source IP (srcip), source port (srcport), destination IP (dstip), destination port (dstprt), and protocol (proto)). The claimed subject matter and more particularly extraction component 304 attempts to generate transactions, which can be a sequence of packets that are closely related to one another within a flow.

For TCP packets, extraction component 304 or more properly TCP component 402 can utilize SYN fields or a SYN-ACK fields without a preceding SYN field in the TCP packet to indicate the start of a new transaction, and FIN fields or RST fields of the TCP packet to indicate the end of the current transaction in the flow. It has been found that some servers use TCP keep-alive messages to test whether the other end is still "alive", this is especially the case where there is a long silence or the current information exchange has just finished. In either case, TCP component 402 can infer that a previous transaction has just finished and that a new transaction is about to begin after the keep-alive message is received—if TCP component 402 identifies keep-alive messages in a flow, TCP component 402 can terminate the previous transaction and start a new transaction after the keep-alive is finished. Moreover, TCP component 402 can have a timeout scheme or facility where if the time difference between two consecutive packets within the same flow is larger than a predefined value (e.g., five seconds) TCP component 402 can end the previous transaction and start a new one.

For UDP packets, because UDP flows typically do not have parseable syntaxes that can be easily followed, extraction component 304 and in particular UDP component 404 can put a sequence of contiguous UDP packets within the same flow provided the time interval for receipt of the packets falls within a particular timeout value. This sequence of contiguous UDP packets can be considered a transaction for the purposes of the claimed subject matter.

Having aggregated single packets into transaction, extraction component 304 can infer a per-host based transaction based on packet traces collected from a few routers. One approach—a naïve approach—that can be adopted by extraction component 304 is to have a list of per-host based queues and to classify any packets with related hosts and then extract transactions for a host from the accordingly developed queue of packets. Another approach to inferring the per-host based transactions based on packet traces collected from a few routers is to employ a global hash table to store flow level information. Thus, when extraction component 306 processes a new packet, it can first try to locate the appropriate flow that the packet belongs to using the five-tuple (e.g., source IP (srcip), source port (srcport), destination IP (dstip), destination port (dstprt), and protocol (proto)) as an index. If the flow does not exist, extraction component 306 can create a flow record using the current packet as the initial packet. Otherwise, extraction component 306 can check whether the previous packets within the flow should be extracted as a transaction—whether the current packet causes a timeout, is recognized as TCP keep-alive, or has associated therewith a FIN or RST flag. In the case of UDP flows processing can be slightly more complex, because two packets exchanged between two hosts might be contiguous for one host but not contiguous for the other. The extraction component 306 can overcome this problem by maintaining two records for each UDP flow, one for the smaller IP and the other for the larger IP. The extraction component 306 can thus keep an extra data structure that saves the most recent flow for each IP, so that it can check every time whether a new UDP packet is contiguous or not.

Additionally, clients can use random ports to access particular types of services, thus extraction component 304 can attempt to restrict the size of the global hash table. Since the five tuple representing access to a particular service over a random port might only happen once or, if it occurs more frequently, extremely rarely, extraction component 304 can restrict the size of the global hash table by periodically cleaning the hash table by removing flow entries that have timed-out.

After generating transactions from individual packets, extraction component 304 can form a more compact and meaningful view of the traffic between hosts. Transactions derived in this manner provide a much more powerful and general conceptualization than simply looking at message-based communications, which need to be further parsed or where applications need to be modified to provide more logging.

Figure 5:
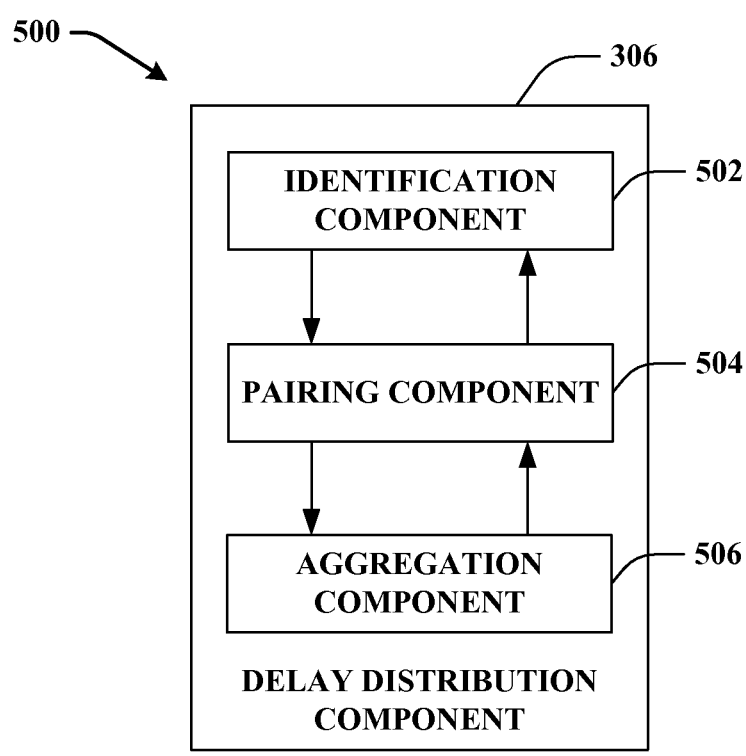
FIG. 5 provides a more detailed illustration of a delay distribution component that facilitates or effectuates automatic resolution or compilation of dependency graphs that identifies service dependencies in enterprise networks in accordance with an aspect of the claimed subject matter.

FIG. 5 provides a more detailed illustration 500 of a delay distribution component 306 that facilitates or effectuates automatic resolution or compilation of dependency graphs that identifies service dependencies in enterprise networks in accordance with an aspect of the claimed subject matter.

Delay distribution component 306 can be utilized after a list of transactions from each host has been extracted by extraction component 304 to determine the delay distribution between services from a single host's perspective. In order to accomplish this, delay distribution component 308 can include identification component 502, pairing component 504, and aggregation component 506.

Each transaction typically is a sequence of packets exchanged between two hosts that share the same five-tuple (e.g., source IP (srcip), source port (srcport), destination IP (dstip), destination port (dstprt), and protocol (proto)). If a host acts as a client, issuing a request to a server machine, the local IP of the transaction is its own IP and a local port is usually randomly assigned by the operating system, while the remote IP is the server's IP and the remote port is usually determined by the application, 53 for DNS service, 88 for Kerberos service, for example (e.g., remote IP, remote port, protocol). If a host acts as a server, receiving a request from a client machine, the local IP of the transaction is its own IP and the local port is determined by the application that the server is running. The remote IP is the client's IP, while the remote port is randomly chosen by the client (e.g., local IP, local port, protocol).

Thus, for each transaction identification component 502 can divide the transaction into two ends (remote IP, remote port, protocol) and (local IP, local port, protocol). Each transaction for a host can be either the host contacting another server as a client or being contacted by another client as a server. In both cases, only one of the two ends should be treated as real service, while the other end is a client using a random port.

Identification component 502 thus can use a simple heuristic to infer the services based on frequency count—a real service (IP, port, protocol) tuple is likely to be contacted by different clients multiple times, while a non-service (IP. Port protocol) tuple is typically only used by a client a few times. Accordingly, identification component 502 can go through the data once to generate the frequency count for all possible (IP, port, protocol) tuples. Thus given a transaction, identification component 502 can compare the frequency of local end and remote end—the end with larger frequency count is the actual service.

For a transaction from the perspective of a host, if the remote side is a real service, it can be said that the host is accessing a remote service, otherwise, it is providing a local service. Accordingly, pairing component 504 can use timestamps of the first and last packets of a transaction to be the start and end time of the transaction to identify service pairs. Thus, while two dependent services might not occur with great frequency, when they do happen together, the distribution of the time delay between then should show significant spikes, indicating typical delay values. Consequently, pairing component 504 can determine delay distributions for all service pairs, and in particular, can, without limitation, determine delay distributions for three types of service pairs: remote-remote, local-remote, and remote-local pairings. However, as will be appreciated by those moderately cognizant in this field of endeavor, pairing component 504 can consider all 16 types of delay service pairs (e.g., local-local, etc.).

Remote-remote pairings typically can comprise the end time of a remote service to start time of another remote service. In this instance, it can be claimed that accessing a second service can be dependent on a first service. For example, after a client receives a reply from a DNS server, it processes the DNS response and then initiates a connection to a web server.

Local-remote pairings generally can comprise the start time of a local service to the start time of a remote service. For example, a front-end server, after receiving a request from a client, processes the request and then initiates a transaction to query a back-end database for appropriate information to return to the client. In this instance, it can be stated that the local service depends on the remote service.

Remote-local pairings typically can include the end time of a remote service and the end time of a local service. For example, a web server receiving a response from a back-end SQL server, processing the response and forwarding appropriate information back to the client and then terminating the transaction. In this instance, it can be said that the local service depends on the remote service.

Pairing component 504 can enumerate all transactions related to a particular host. For any two transactions that satisfy one or more of remote-remote, local-remote, or remote-local criteria and/or occur within a definite time window or definable time horizon, pairing component 504 can associate a delay value to a delay distribution according to a service pair. Typically, the time window or time horizon can be selected to be a relatively large value, for example 3 seconds; as it has been found that such duration can be long enough to capture any dependency relationships. Nevertheless, other duration of great or lesser extent can be employed without departing from the intent and scope the claimed subject matter. Moreover, since the granularity of the timestamps are typically at the millisecond level, pairing component 504 can consign delay samples into bucket whose size is at the 1 millisecond level.

Further, delay distribution component 306 can also include aggregation component 506 that can be employed after generating the delay distribution for all service pairs observed by individual hosts. Aggregation component 506 can agglomerate the delay distributions across hosts. Such aggregation can be based on the premise that single hosts typically do not see sufficient samples to produce a significant delay distribution. For example, a secondary DNS service might rarely be contacted so that pairing component 506 may have very few delay samples between the DNS service and Web service. Nevertheless, by aggregating across hosts, pairing component 506 can have many more samples for this distribution. It should be noted that this methodology works not only for remote-remote distribution, but also for the local-remote and remote-local cases as well. Moreover, pairing component 506, if it can identify a list of services that are actually the load balancers for a single website, it can aggregate these distributions together as well.

Figure 6:
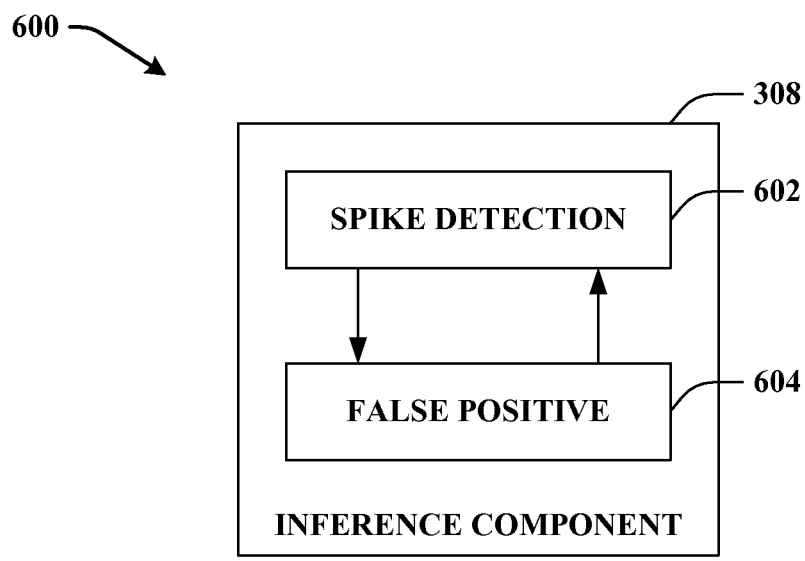
FIG. 6 provides a further depiction of an inference component that effectuates or facilitates dynamic fabrication or formulation of dependency graphs that classifies service dependencies in enterprise networks in accordance with an aspect of the subject matter as claimed.

FIG. 6 provides a further depiction 600 of an inference component 308 that effectuates and facilitates dynamic fabrication or formulation of dependency graphs that classifies service dependencies in enterprise networks in accordance with an aspect of the subject matter as claimed. After generating the delay distributions, the claimed subject matter needs to be able to differentiate the dependent service pairs from the independent service pairs. The basic reasoning for this requirement being that dependent services are likely to be separated by a typical time delay, characterizing the usual processing time of the applications. In terms of delay distribution graphs, there can be significant spikes which the claimed subject matter detects utilizing spike detection component 602.

There can be a number of challenges in this respect, namely: delay distributions may not have enough samples; and delay distributions may be noisy. Accordingly, spike detection component 602 can take these considerations into account while performing spike detection. Spike detection component 602 can aggregate delay distributions across hosts. For remote-remote service pairs, spike detection component 602 can aggregate across all client hosts. For remote-local and local-remote service pairs, spike detection component 602 can aggregate across machines that are known to host the same local service. Further, spike detection component 602 can utilize smoothing techniques to eliminate noise in the distributions. For example, spike detection component 602 can utilize a moving average or a median filter. Both techniques take a window size 2*N+1 buckets, reassign the value of the $(N+1)^{th}$ bucket to either the average or the median of the values that fall within the window. Both approaches or strategies can achieve similar results in filtering noise. Moreover, spike detection component 602 can employ simple thresholding to detect spikes, for example, using t=mean+ N*spread or t=median+N*spread, where spread is set to the $75^{th}$ percentile minus the median, and establishing N to be a value of 3 or 4 can detect most spikes. It should be noted that the foregoing values are provided solely for the purposes of exposition rather than limitation. Accordingly, as will be appreciated by those reasonably or moderately conversant in this particular field of endeavor, other values can be utilized with equal utility without departing from the spirit, intent, or scope of the claimed subject matter.

For simple or basic spike detection the results provided by spike detection component 602 alone can be satisfactory, especially for server-side dependency discovery or detection (e.g., for local-remote and/or remote-local dependencies), however, there are instances where the results from spike detection component 602 can require augmentation. This is particularly the case for client-side dependencies, which are typically remote-remote relationships, where there can be some false-positives generated. These false positives are typically introduced by clients' periodically accessing a particular service. For example, one client may connect to multiple exchange servers simultaneously for different purposes. Since the client needs to periodically access the exchange server, the delay distribution of two independent services can show multiple huge spikes which are separated by the same or similar distance, characterizing the accessing period. In order to take into consideration any false positives that can arise, inference component 604 can include a false positive aspect or component 604 that can eliminate or greatly reduce false positives that can be introduced by the periodic access of particular services and can cut down the computational complexity for spike detection for remote-remote dependencies.

For remote-remote dependency, the claimed subject matter needs to bridge a client's accessing at least two services. Given that the total amount of time that an end user experiences in accessing a service is typically less than a second, then it should typically hold true that where a client is accessing at least two services that these services should occur within a short duration of time. Accordingly, based at least in part on this postulate and the fact that the claimed subject matter uses a fairly large time-window (e.g., 3 seconds), it is fair to assume that for dependent services, most delay samples should fall into the first half of all the buckets. Thus, false positive component or aspect 604 can compare the number of samples that fall into the first half and second half of the delay distribution graph and determine that if the ratio of the number of samples in the first half and second half of the delay distribution graph exceeds 0.75, ($Num_{right}$: $Num_{left}$>0.75), for instance, then no dependency exists, otherwise false positive component or aspect 604 can utilize, once smoothing has been effectuated, the facilities of spike detection component 602 or cause spike detection component 602 to undertake further spike detection analysis.

Figure 7:
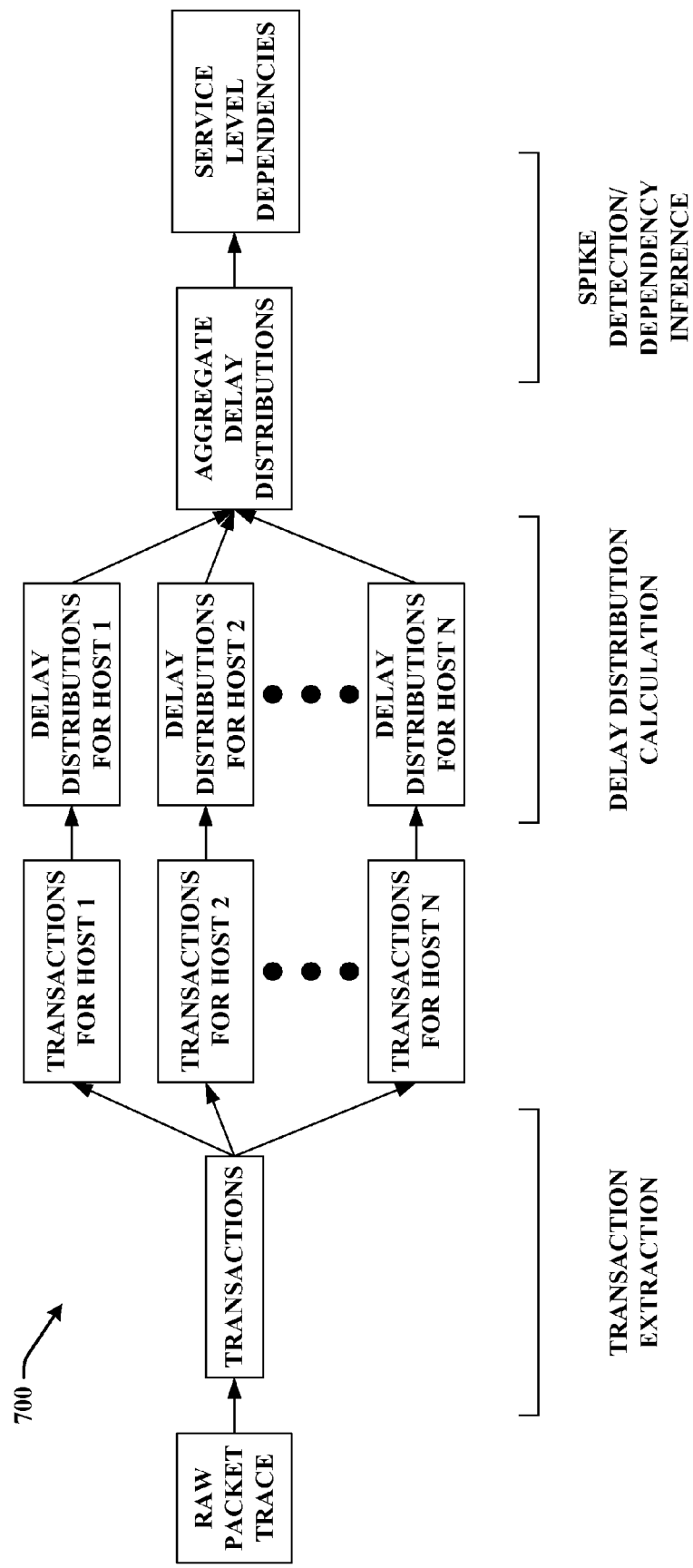
FIG. 7 provides an overall schematic for ascertaining service dependencies in enterprise networks in accordance with an illustrative aspect of the claimed subject matter.

FIG. 7 provides an overall schematic 700 for ascertaining service dependencies in enterprise networks in accordance with an illustrative aspect of the claimed subject matter. As depicted on schematic 700 and reading the illustration from left to right, raw packet data can be received and thereafter accumulated or agglomerated into transactions for each respective host. Once transactions from each host have been acquired and aggregated for each host, delay distribution determination for each respective host can be established after which the delay distribution for each respective host can be aggregated at which point spike detection can be applied to provide a graphic representation of service-level dependencies that exist within the network.

Figure 8:
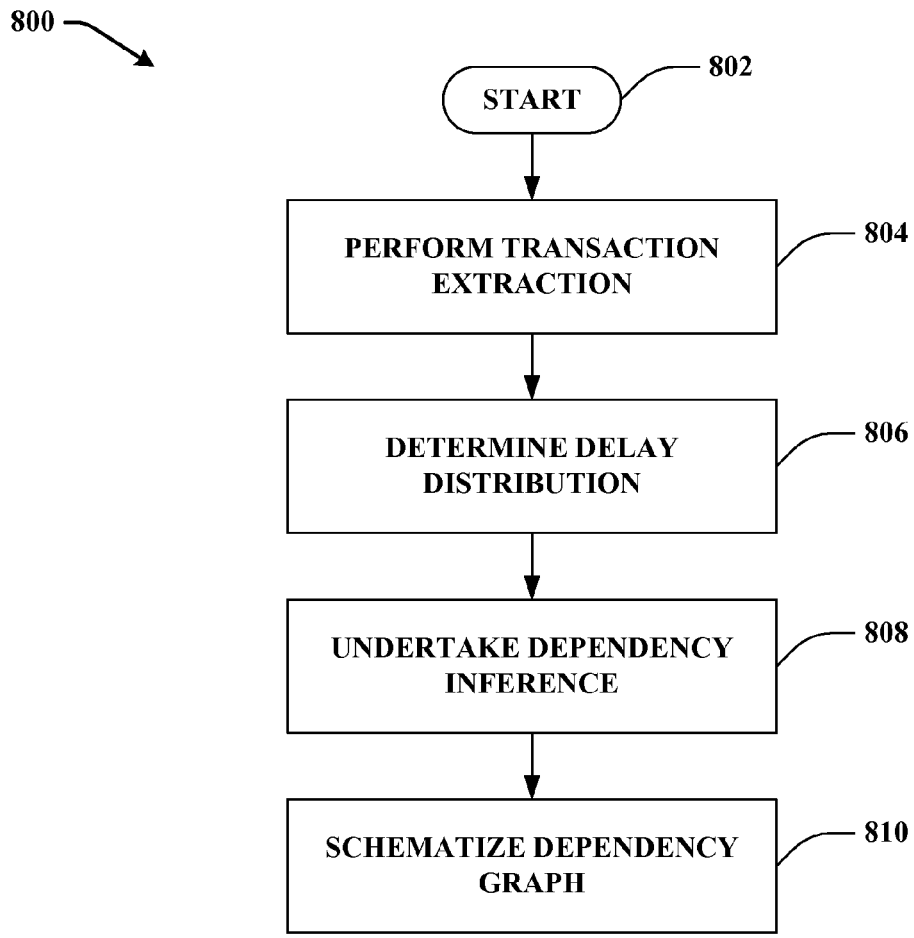
FIG. 8 depicts a flow diagram of a machine implemented methodology that effectuates or facilitates automatic creation or schematization of dependency graphs that identifies service dependencies in enterprise networks in accordance with an aspect of the claimed subject matter.
Figure 9:
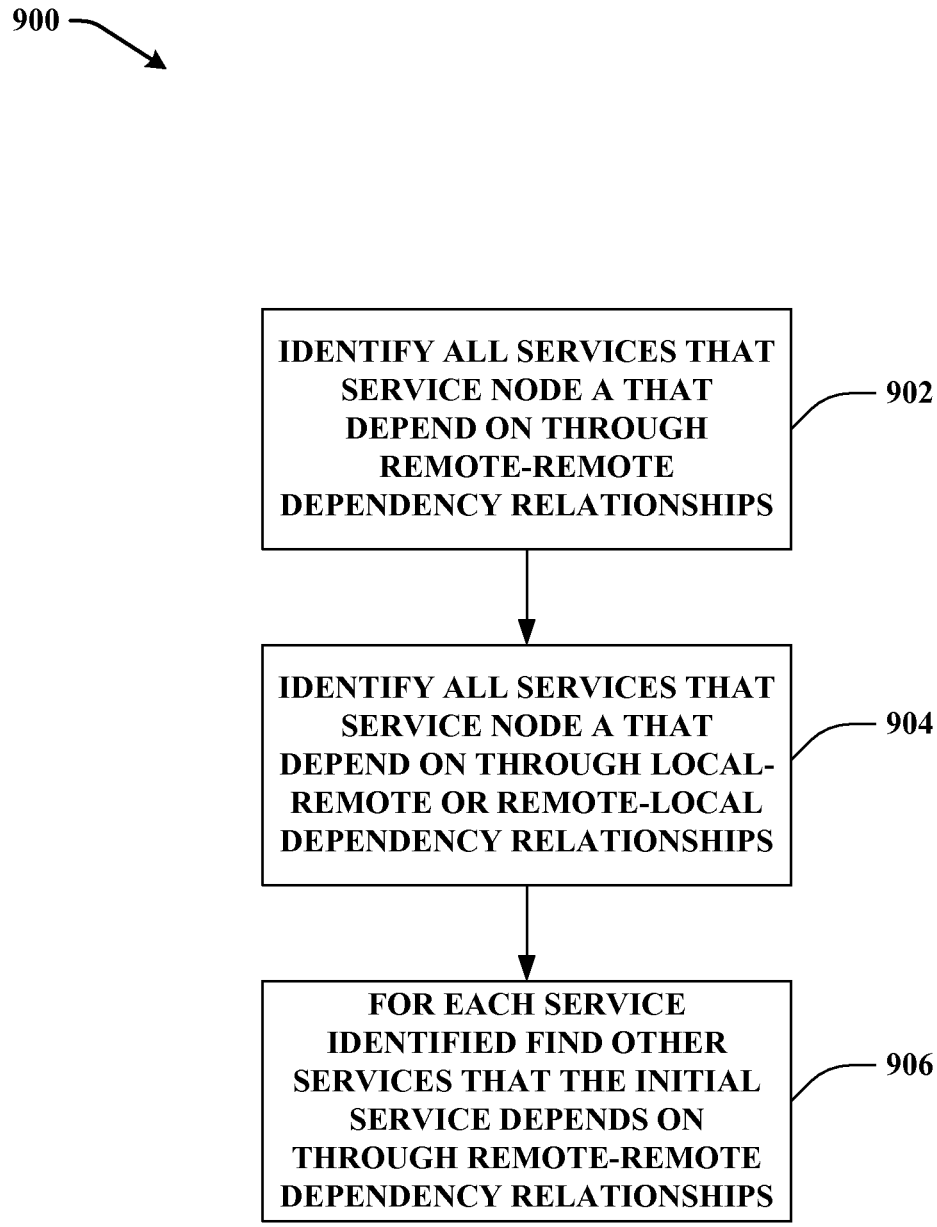
FIG. 9 illustrates a flow diagram of a machine implemented methodology that effectuates or facilitates identifying a dependency graph that accentuates or makes manifest service dependencies in enterprise networks in accordance with an aspect of the claimed subject matter.

In view of the illustrative systems shown and described supra, methodologies that may be implemented in accordance with the disclosed subject matter will be better appreciated with reference to the flow charts of FIG. 8-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 8 depicts a flow diagram of a machine implemented methodology 800 that effectuates and facilitates automatic creation or schematization of dependency graphs that identify service dependencies in enterprise networks in accordance with an aspect of the claimed subject matter. Method 800 can commence at 802 where various processor initializations tasks and background activities can be performed as power is applied to the subject matter as claimed. After these tasks have been performed the method can proceed to 804 at which point transaction extraction can be undertaken. At 804 intercepted, actively and/or passively acquired, and/or received packets can be aggregated into transactions for each host. Transaction extraction can, without limitation, be based on disparate protocol (e.g., Transmission Control Protocol (TCP), User Datagram Protocol (UDP), etc.) packets. For example, for TCP packets, utilization of SYN flags or SYN-ACK without the preceding SYN flags can be employed to denote the start of transactions, and FIN or RST flags can be employed to indicate the end of a transaction flow. For UDP packets, contiguous packets within the same flow whose interval falls within a particular timeout interval can be associated together to form a single transaction. This is because UDP, unlike TCP, does not have a syntax structure that permits facile parsing of the packets. At 806 delay distributions for each transaction where a service can be identified can be determined. The service typically will be one that is contemporaneously or nearly simultaneously being utilized from both the client and server sides. Having established associated or affiliated service pairs (e.g., remote-remote, local-remote, or remote-local), these service pairs can be utilized to ascertain delay distributions for all service pairs observed by individual hosts, after which these delay distributions can be agglomerated, accumulated, assembled, combined, or amassed across multiple hosts; the rationale for this latter element (e.g., conglomerating the delay distributions for all service pairs observed that individual hosts across multiple hosts) is that there is a possibility that individual hosts may not see sufficient samples for specific delay distributions. At 808 differentiation of dependent service pairs from independent service pairs can be inferred. Such differentiation and inference can be based on the presumption that dependent services are more likely to be separated by a typical time delay which can be attributed to the usual processing time of applications. At 810 dependency graph schematization can be facilitated wherein the ascertained dependency relationships can be coalesced to provide dependency graphs that can be output and utilized for various tasks, such as capacity planning, impact planning, and/or network administration and/or analysis, for example.

FIG. 9 illustrates a flow diagram of a machine implemented methodology 900 that effectuates and facilitates identifying a dependency graph that accentuates or makes manifest service dependencies in enterprise networks in accordance with an aspect of the claimed subject matter. After generating all the dependency relationships on both the client side and the server side these dependency relationships can be combined together to form a generic dependency graph that can be further utilized. Thus, given a particular service A that requires investigation, the claimed subject matter can identify the dependency graph for this service in the following manner and utilizing methodology 900. At 902 all services that service A depends on through remote-remote dependency relationships can be identified. Here all services that occur before service A and delays showing typical values can be identified. These dependency relationships can be identified through the aggregated client-side dependency information. For example, a web service that depends on a DNS service can be identified. At 904 all services that service A depends on through local-remote or remote-local dependency relationships can be identified. These dependencies can reveal all the services that service A relies on from the server side. For instance, a web service that depends on a backend SQL service can be identified. At 906, for each service identified the methodology 900 can further find other services that the initial service depends on through remote-remote dependency relationships. For example, a backend SQL service can depend on an authentication service and thusly can be identified. This means, for instance, that in order to access the SQL service, the front end server needs to also contact the authentication service to acquire a security token.

Figure 10:
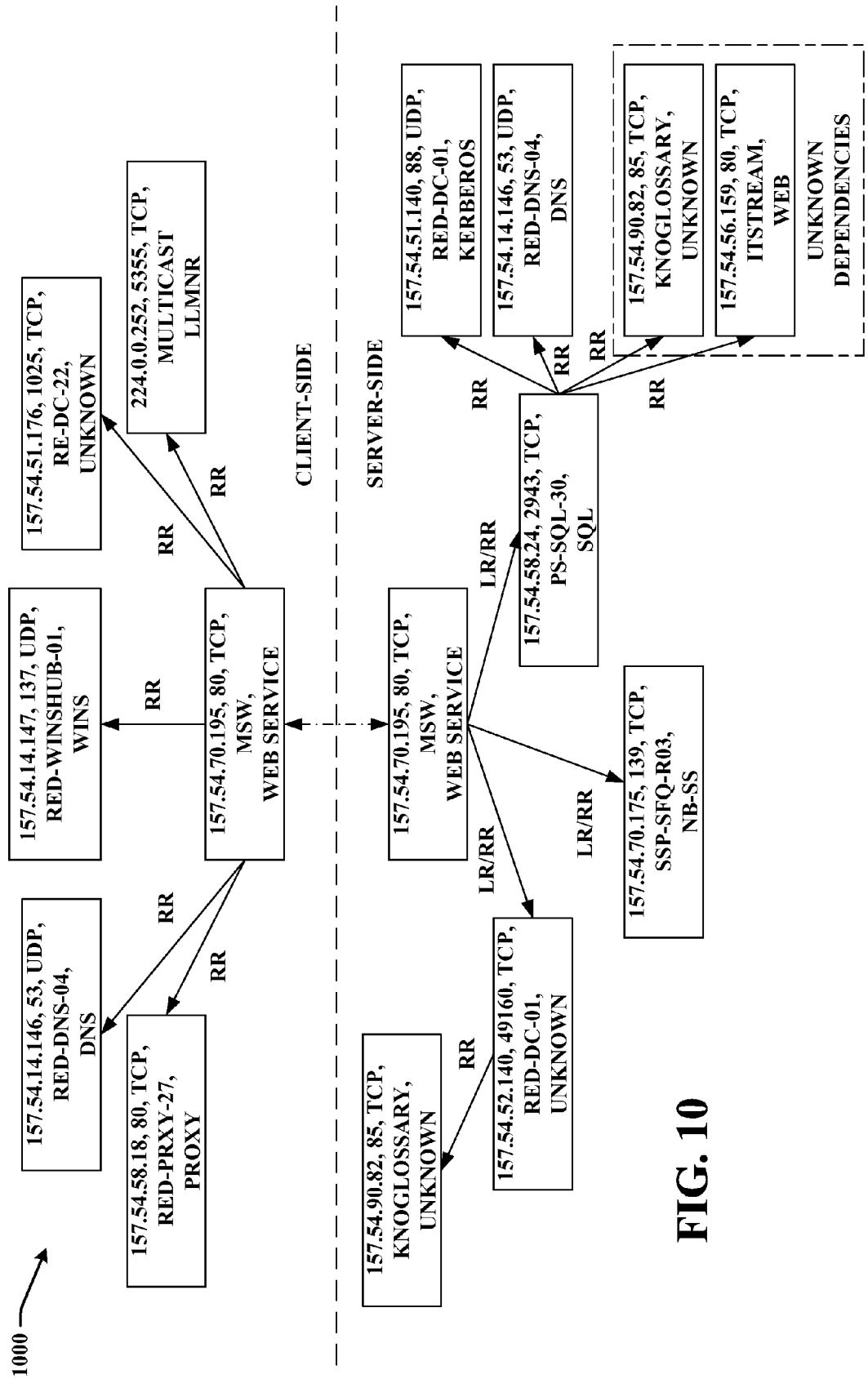
FIG. 10 depicts an illustrative dependency graph assembled in accordance with an aspect of the subject matter as claimed that discloses service dependencies in an enterprise network.

FIG. 10 depicts illustrative dependency graph 1000 assembled in accordance with an aspect of the claimed subject matter that discloses service dependencies in an illustrative enterprise network. From the client side, the illustrative dependency graph 1000 depicts a web service that depends on DNS, WINS, LLMNR (e.g., Local Link Multicast Name Resolution), and a proxy service that can help determine whether a particular website is an internal website or an external one. On the service side, dependency graph 1000, identifies that the web service depends on a backend SQL service, which can be fairly typical. Moreover, as illustrated, from the remote-remote (RR) dependency on the server side, access to the SQL service further requires access to DNS and Kerberos services, which is understandable, since web servers can generally be configured to use the domain name of the SQL service rather than it's IP address, so each time it has to resolve the domain name. Also, accessing SQL service can require authentication, which can be performed by a Kerberos service. It should be noted in connection with FIG. 10 that the abbreviations RR, LR, and RL associated with respective edges of the dependency graph represent remote-remote (RR), local-remote (LR), and remote-local (RL) dependency relationships between the various services depicted.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 11:
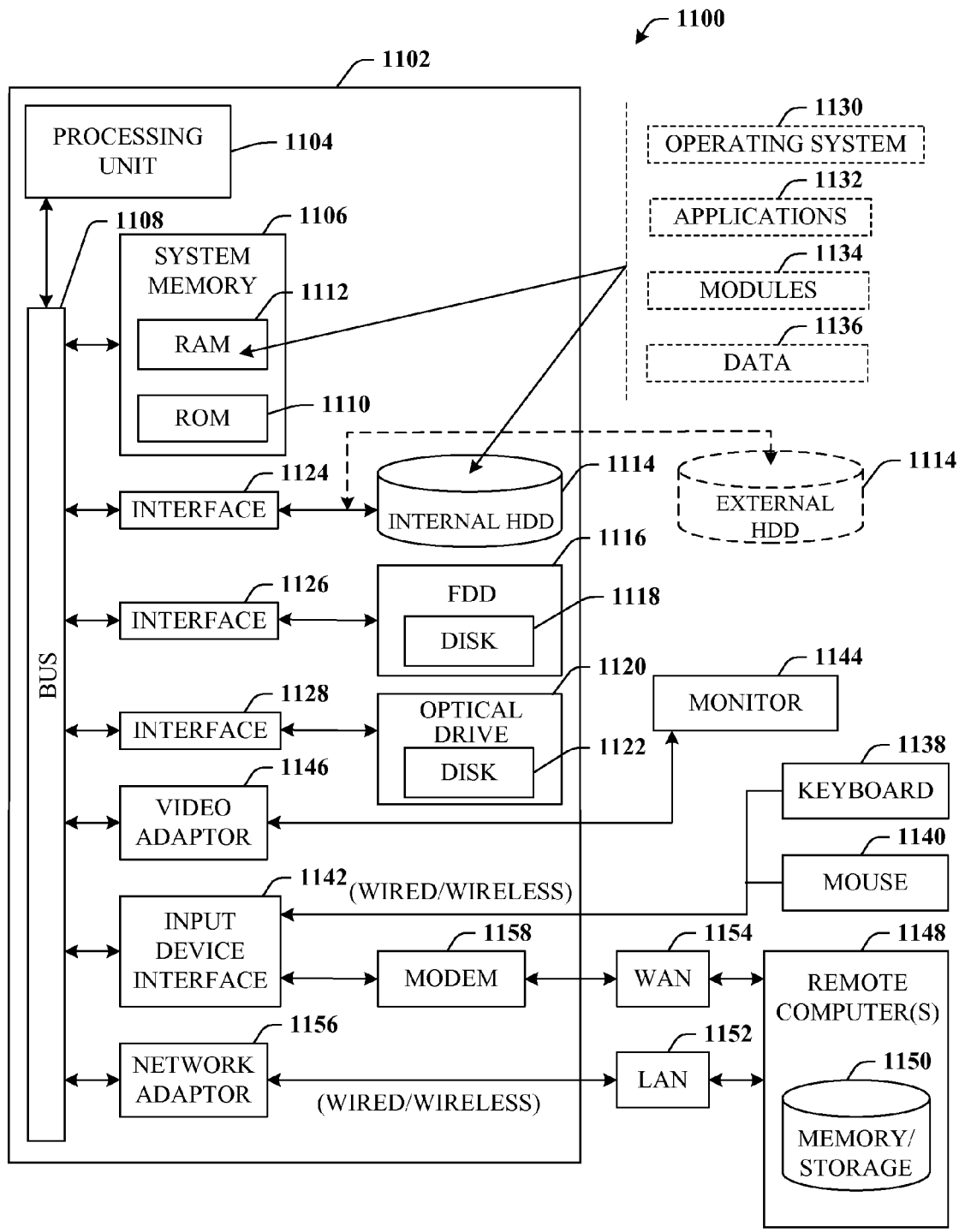
FIG. 11 illustrates a block diagram of a computer operable to execute the disclosed system in accordance with an aspect of the claimed subject matter.

Referring now to FIG. 11, there is illustrated a block diagram of a computer operable to execute the disclosed system. In order to provide additional context for various aspects thereof, FIG. 11 and the following discussion are intended to provide a brief, general description of a suitable computing environment 1100 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the illustrative environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1194 interface technologies. Other external drive connection technologies are within contemplation of the claimed subject matter.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed and claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the claimed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1194 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are illustrative and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 12:
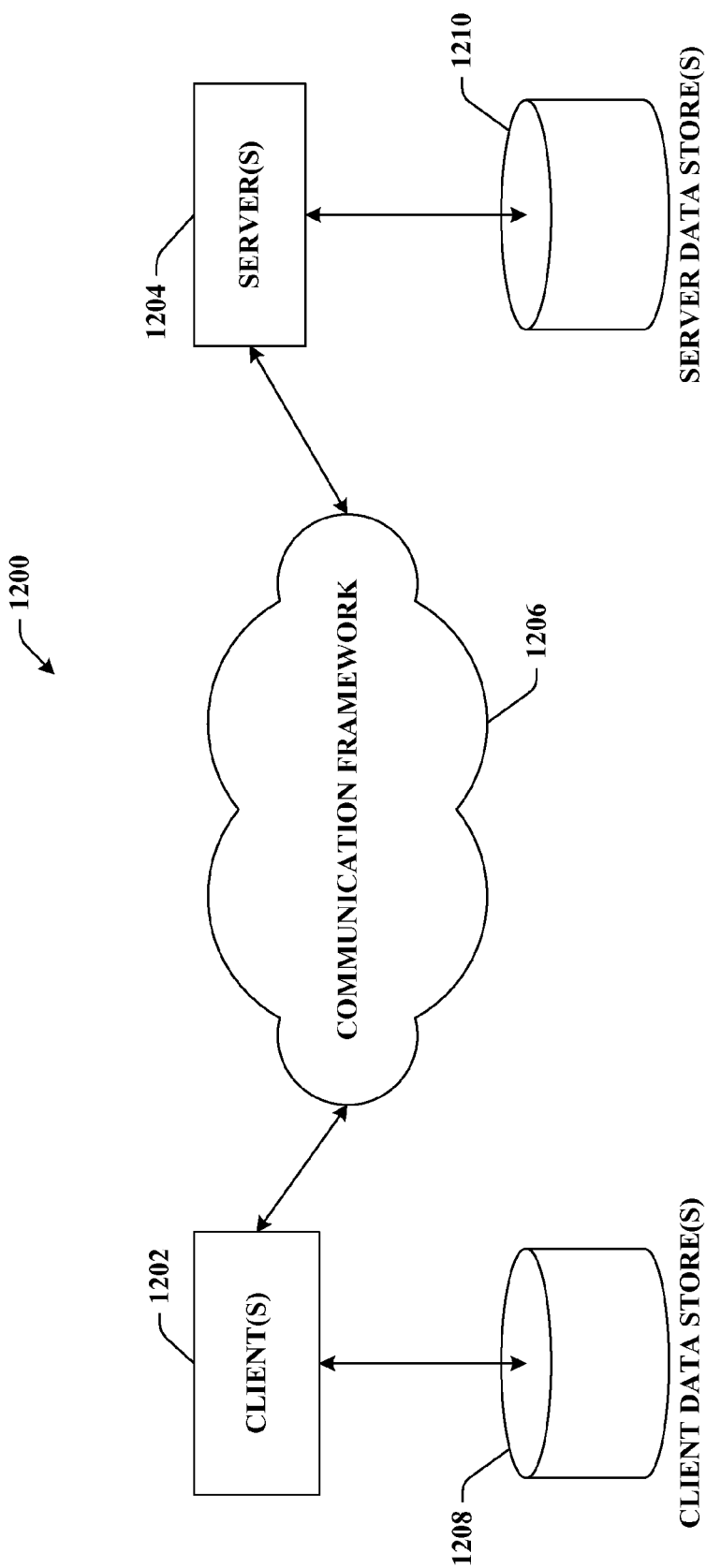
FIG. 12 illustrates a schematic block diagram of an illustrative computing environment for processing the disclosed architecture in accordance with another aspect.

Referring now to FIG. 12, there is illustrated a schematic block diagram of an illustrative computing environment 1200 for processing the disclosed architecture in accordance with another aspect. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine-implemented system configured to automatically effectuate and facilitate service dependency identification in enterprise networks, the machine-implemented system comprising:
    a processor configured to;
        identify, from network data packets, a related packet with source, destination, and protocol information similar to that of a previous packet;
        aggregate the related packet with the previous packet to form a transaction associated with an individual host;
        employ the transaction associated with the individual host to determine a delay distribution between one or more services associated with the individual host from a perspective of the individual host;
        differentiate between a dependent service pair and an independent service pair by identifying one or more spikes in the delay distribution that meet a predefined condition; and
        provide a probability density function dependency graph that includes dependency relationships between services based on the differentiation between the dependent service pair and the independent service pair.

2. The machine-implemented system of claim 1, wherein at least one of a SYN flag or a SYN-ACK flag without a preceding SYN is employed to indicate a start of the transaction, and at least one of a FIN flag or a RST flag is employed to indicate an end of the transaction.

3. The machine-implemented system of claim 1, wherein a sequence of contiguous packets received within a time-out period comprise the transaction.

4. The machine-implemented system of claim 1, wherein the delay distribution ascertained from the perspective of the individual host is combined with a delay distribution determined from a perspective of a second host, the individual host and the second host being configured to perform a similar local service.

5. The machine-implemented system of claim 1, wherein noise is eliminated from the delay distribution.

6. The machine-implemented system of claim 1, wherein spike analysis is performed based on thresholding.

7. The machine-implemented system of claim 1, wherein the source, destination, and protocol information includes one or more of a source internet protocol (IP) address, a source port number, a destination IP address, a destination port number and a protocol type.

8. The machine-implemented system of claim 1, wherein flow level information is stored in a global hash-table utilizing an index key determined from the source, destination, and protocol information.

9. The machine-implemented system of claim 1, wherein a determination of an actual service is made by comparing a frequency of requests received from a local end and a remote end of the transaction.

10. A method implemented by a computing device for identifying service dependencies in an enterprise network, the method comprising:
- in an enterprise network, identifying two or more related packets having related source, destination, and protocol information;
- evaluating the related packets to ascertain a delay distribution between one or more services solicited from a first host associated with the related packets;
- differentiating between dependent service pairs and independent service pairs by identifying one or more spikes in the delay distribution that meet a predefined condition; and
- using information associated with the service pairs to construct a dependency graph that identifies service dependencies in the enterprise network.

11. The method of claim 10, further comprising parsing each packet utilizing a SYN flag or a SYN-ACK flag without a preceding SYN component to indicate a start of a transaction associated with the related packets.

12. The method of claim 10, further comprising parsing each packet utilizing a FIN or RST flag to identify an end of a transaction associated with the related packets.

13. The method of claim 10, further comprising aggregating the delay distribution ascertained from a perspective of the first host with a delay distribution ascertained from a perspective of a second host.

14. The method of claim 10, further comprising eliminating noise in the delay distribution.

15. The method of claim 10, further comprising identifying false positives introduced by periodic access by the first host to a service.

16. One or more computer storage devices storing computer-readable instructions that, when executed on a computing device, cause the computing device to perform operations comprising:
- locating a related packet having source, destination, and protocol information similar to a previous packet;
- associating the related packet with the previous packet to form a transaction associated with a first host;
- ascertaining a probability distribution function indicative of delay between one or more services solicited from the first host;
- differentiating between a dependent service pair and an independent service pair by identifying spikes in the probability distribution function meeting a predefined condition; and
- providing a dependency graph that identifies service pair dependencies in an enterprise network based on the delay distribution.

17. The one or more computer storage devices of claim 16, further comprising associating a sequence of contiguous packets received within a time-out period to comprise the transaction.

18. The one or more computer storage devices of claim 16, further comprising eliminating false positives that compare a first half of the delay distribution with a second half of the delay distribution by detecting one or more spikes where a ratio of the first half of the delay distribution to the second half of the delay distribution exceeds a limit.

19. The one or more computer storage devices of claim 16, wherein the source, destination, and protocol information includes one or more of a source IP address, a source port number, a destination IP address, a destination port number and a protocol type.

20. The one or more computer storage devices of claim 16, further comprising aggregating the delay distribution associated with the first host with the delay distribution associated with a second host.

* * * * *